(12) United States Patent
Tanabe

(10) Patent No.: US 11,007,788 B2
(45) Date of Patent: May 18, 2021

(54) RECORDING APPARATUS, CONTROL METHOD, AND STORAGE MEDIUM

(71) Applicant: CANON KABUSHIKI KAISHA, Tokyo (JP)

(72) Inventor: Masaki Tanabe, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/514,402

(22) Filed: Jul. 17, 2019

(65) Prior Publication Data

US 2020/0047511 A1 Feb. 13, 2020

(30) Foreign Application Priority Data

Aug. 7, 2018 (JP) ............... JP2018-148581

(51) Int. Cl.
*B41J 2/175* (2006.01)
*H04N 1/00* (2006.01)

(52) U.S. Cl.
CPC ...... *B41J 2/17566* (2013.01); *H04N 1/00129* (2013.01); *B41J 2002/17576* (2013.01)

(58) Field of Classification Search
CPC .................................................. B41J 2/17566
See application file for complete search history.

(56) References Cited

U.S. PATENT DOCUMENTS

| 8,801,158 | B2 * | 8/2014 | Honoki | ............... | B41J 2/17566 |
| | | | | | 347/86 |
| 9,694,587 | B2 * | 7/2017 | Shimomura | ........... | B41J 2/1752 |
| 2002/0024543 | A1 * | 2/2002 | Kimura | ............... | B41J 2/17513 |
| | | | | | 347/7 |
| 2002/0140748 | A1 * | 10/2002 | Kanaya | .................... | B41J 2/195 |
| | | | | | 347/7 |
| 2003/0025742 | A1 * | 2/2003 | Maeda | ................. | B41J 2/17513 |
| | | | | | 347/7 |
| 2008/0117240 | A1 * | 5/2008 | Sheinman | ............... | B41J 2/175 |
| | | | | | 347/6 |
| 2011/0285767 | A1 * | 11/2011 | Tanaka | ................... | B41J 29/393 |
| | | | | | 347/6 |
| 2012/0299989 | A1 * | 11/2012 | Prothon | ................. | B41J 2/175 |
| | | | | | 347/6 |
| 2013/0120491 | A1 * | 5/2013 | Maru | .................... | B41J 2/1752 |
| | | | | | 347/19 |
| 2013/0135401 | A1 * | 5/2013 | Kobayashi | ........... | B41J 2/17566 |
| | | | | | 347/85 |
| 2018/0281394 | A1 * | 10/2018 | Horade | .................... | B41J 29/13 |
| 2018/0281397 | A1 * | 10/2018 | Takagi | ................ | B41J 2/17546 |
| 2018/0281439 | A1 * | 10/2018 | Ogawa | .................... | B41J 29/38 |
| 2019/0105912 | A1 * | 4/2019 | Horade | .................... | B41J 29/38 |
| 2019/0193411 | A1 * | 6/2019 | Minamikawa | ....... | B41J 2/17523 |
| 2020/0047510 | A1 * | 2/2020 | Harai | ................... | B41J 2/17566 |
| 2020/0130360 | A1 * | 4/2020 | Horade | ............... | B41J 2/17546 |

FOREIGN PATENT DOCUMENTS

| JP | 2005-1149 A | | 1/2005 |
| JP | 2005001149 A | * | 1/2005 |

* cited by examiner

*Primary Examiner* — Ted W Barnes
(74) *Attorney, Agent, or Firm* — Canon U.S.A., Inc. IP Division

(57) ABSTRACT

An amount corresponding to the amount of ink stored in a replaceable ink tank is added to the amount of ink stored in a buffer tank and the sum is displayed on a display unit based on acquisition of information indicating that a state in which the replaceable ink tank is not mounted has changed to a state in which the replaceable ink tank is mounted.

18 Claims, 7 Drawing Sheets

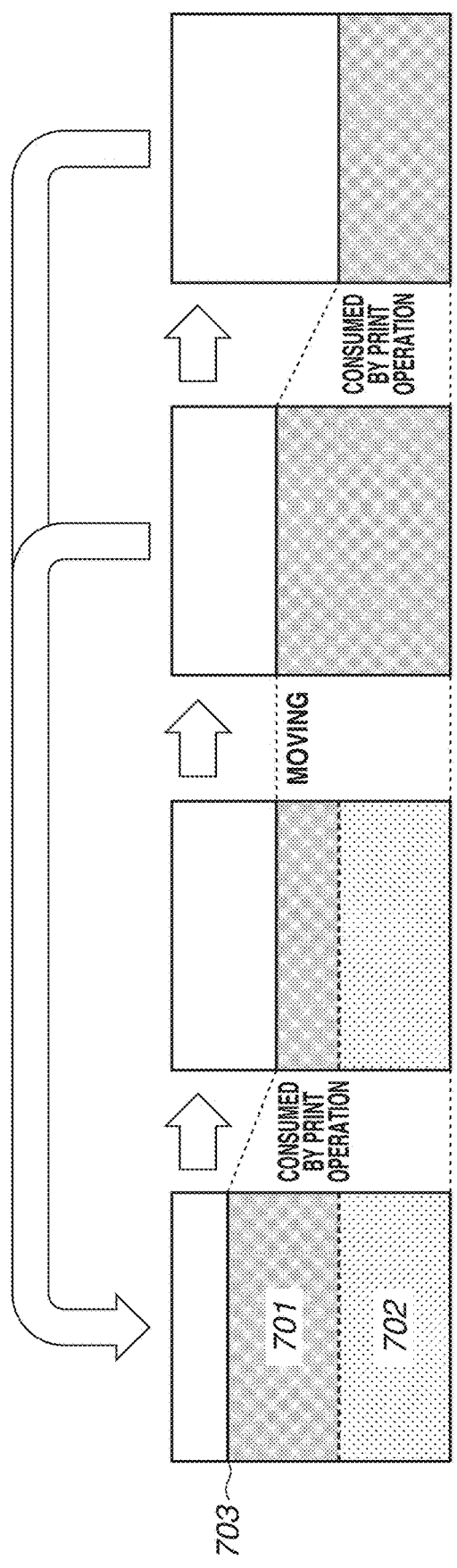

RECORDING APPARATUS, CONTROL METHOD, AND STORAGE MEDIUM

BACKGROUND

Field

The present disclosure relates to a recording apparatus including a reservoir unit for storing ink, a control method for the recording apparatus, and a storage medium.

Description of the Related Art

For a recording apparatus including a plurality of tank mechanisms for storing ink, appropriate management and display of remaining ink amounts has heretofore been demanded. Japanese Patent Application Laid-Open No. 2005-1149 discusses a recording apparatus configured to supply ink from ink cartridges to a head unit that discharges the ink. The recording apparatus displays both graphical illustrations expressing the remaining ink amounts of the ink cartridges and graphical illustrations expressing the remaining ink amounts of ink storage tanks provided in the head unit. According to a method discussed in Japanese Patent Application Laid-Open No. 2005-1149, the ink cartridges and the ink storage tanks of the head unit each include a remaining ink amount detection mechanism. Thus, the user can determine the remaining ink amounts of the respective plurality of ink storage tanks.

However, it is difficult to apply the method discussed in Japanese Patent Application Laid-Open No. 2005-1149 if reservoir units such as ink storage tanks are unable to include remaining amount detection mechanisms. For example, if a container such as a bag-in-box that includes no mechanism for detecting a remaining amount is used as a replaceable ink tank, unlike the method discussed in Japanese Patent Application Laid-Open No. 2005-1149, the remaining amounts in all the reservoir units are unable to be directly detected.

SUMMARY

According to an aspect of the present disclosure, a recording apparatus includes a recording unit, a first reservoir unit configured to store a recording material to be supplied to the recording unit, a detection unit configured to detect an amount of the recording material stored in the first reservoir unit, a mounting unit configured to detachably mount a second reservoir unit configured to store the recording material to be supplied to the first reservoir unit, a moving unit configured to perform a moving operation for moving the recording material stored in the second reservoir unit to the first reservoir unit, an acquisition unit configured to acquire information indicating that a state in which the second reservoir unit is not mounted on the mounting unit has changed to a state in which the second reservoir unit is mounted on the mounting unit, and a display control unit configured to display an amount on a display unit based on a fact that the information is acquired by the acquisition unit, wherein the amount is acquired by adding the amount detected by the detection unit and a predetermined amount corresponding to an amount of the recording material stored in the second reservoir unit.

Further features will become apparent from the following description of exemplary embodiments with reference to the attached drawings.

BRIEF DESCRIPTION OF THE DRAWINGS

FIGS. 7A, 7B 7C, and 7D are conceptual diagrams illustrating transitions of the remaining ink amount display.

DESCRIPTION OF THE EMBODIMENTS

Figure 1:
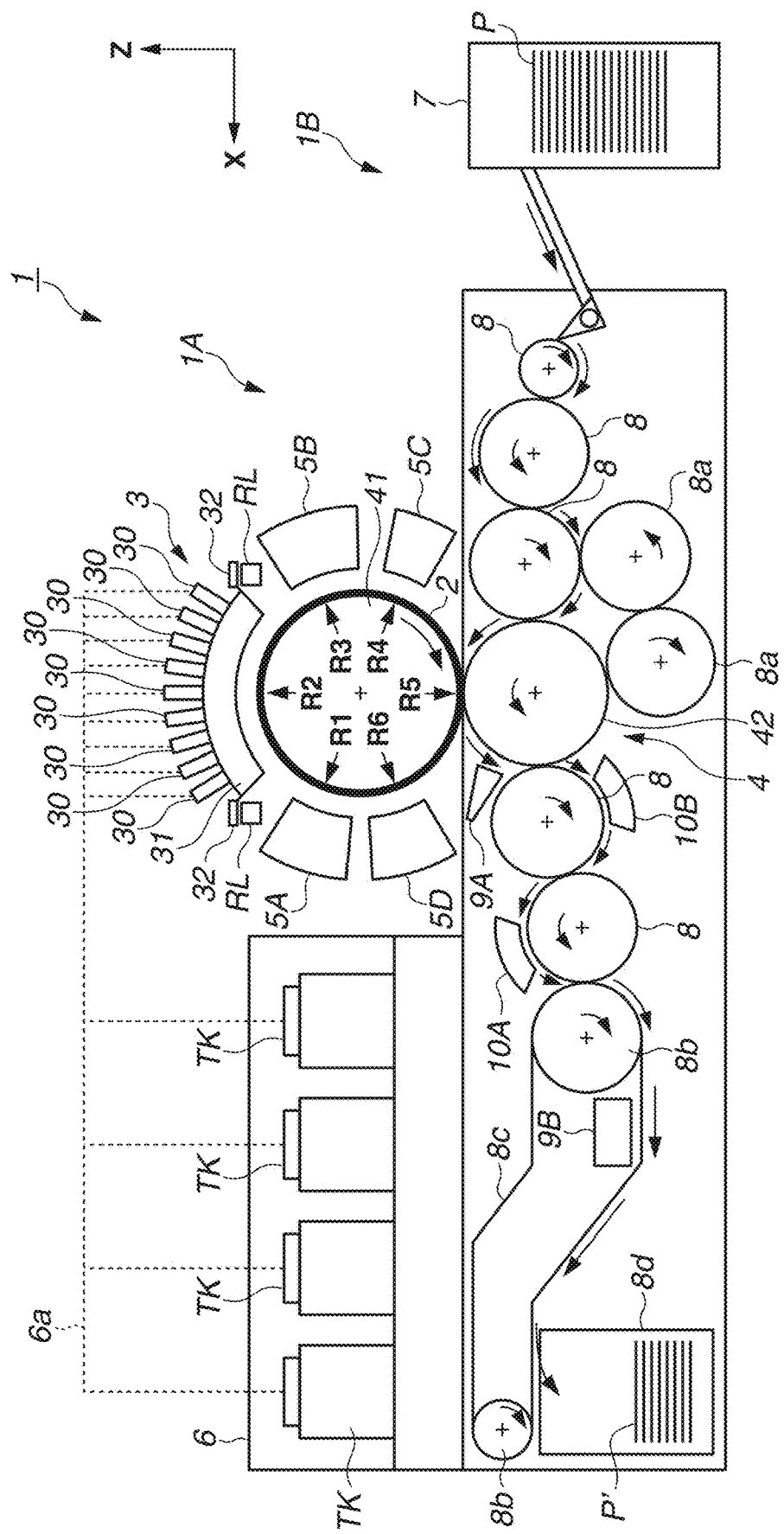
FIG. 1 is a diagram schematically illustrating a recording system.

Exemplary embodiments will be described below with reference to the drawings.

In the drawings, arrows X and Y indicate horizontal directions that are mutually orthogonal. An arrow Z indicates a vertical direction.

<Recording System>

FIG. 1 is a front view schematically illustrating a recording system 1 according to an exemplary embodiment. The recording system 1 is a sheet-type inkjet printer that manufactures recording products P' by transferring ink images to recording media P via a transfer member 2. The recording system 1 includes a recording apparatus 1A and a conveyance apparatus 1B. In the present exemplary embodiment, the X, Y, and Z directions represent a width direction (overall length direction), a depth direction, and a height direction of the recording system 1, respectively. The recording media P are conveyed in the X direction.

The term "recording" is not limited to cases of forming meaningful information such as texts and figures, but widely covers cases of forming images and patterns, whether meaningful or meaningless, on a recording medium or even processing the recording medium. Whether the outcome is apparent and perceptible to human eyes does not matter. In the present exemplary embodiment, a "recording medium" is assumed to be a sheet of paper, whereas cloth or a plastic film may be used.

In the present exemplary embodiment, ink is used as a recording material. Components of the ink are not limited in particular. In the present exemplary embodiment, aqueous pigment ink containing a pigment that is a color material, water, and resin is used.

<Recording Apparatus>

The recording apparatus 1A includes a recording unit 3, a transfer unit 4, peripheral units 5A to 5D, and a supply unit 6.

<Recording Unit>

Figure 2:
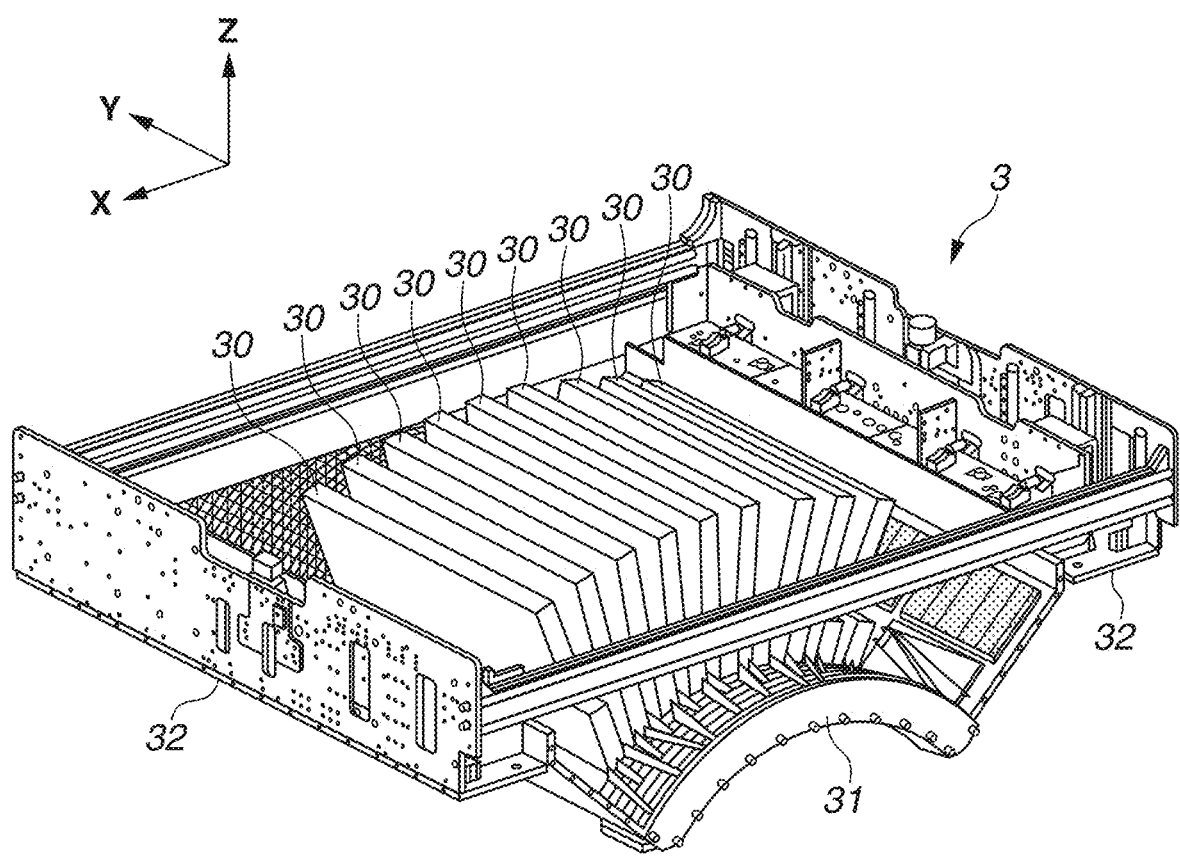
FIG. 2 is a perspective view of a recording unit.

The recording unit 3 includes a plurality of recording heads 30 and a carriage 31. Refer to FIGS. 1 and 2. FIG. 2 is a perspective view of the recording unit 3. The recording heads 30 discharge liquid ink to the transfer member 2 to form an ink image of a recording image on the transfer member 2.

In the present exemplary embodiment, each of the recording heads 30 is a full-line head extended in the Y direction. Nozzles are arranged in a range covering the width of an image recording area of a recording medium of the maximum usable size. The recording head 30 has an ink discharge surface in which the nozzles are opened at the bottom. The ink discharge surface is opposed to the surface of the transfer member 2 via a small gap (for example, several millimeters). In the present exemplary embodiment, the transfer member 2 is configured to move cyclically on a circular orbit, and the plurality of recording heads 30 is radially arranged.

Each of the nozzles includes a discharge element. For example, the discharge element is an element that discharges ink in the nozzle by generating pressure inside the nozzle. Technologies related to inkjet heads of conventional inkjet printers can be applied. Examples of the discharge element include an element that discharges ink by causing film boiling of the ink with an electrothermal transducer to form a bubble, an element that discharges ink by using an electromechanical transducer, and an element that discharges ink by using static electricity. In view of high-speed high-density recording, the discharge element using an electrothermal transducer can be used.

In the present exemplary embodiment, there are provided nine recording heads 30. The recording heads 30 discharge respective different types of ink. Examples of the different types of ink include inks containing different color materials, such as yellow ink, magenta ink, cyan ink, and black ink. One recording head 30 discharges one type of ink. Alternatively, a recording head 30 may be configured to discharge a plurality of types of ink. With the plurality of recording heads 30 provided in such a manner, some of the recording heads 30 may discharge ink containing no color material (for example, clear ink). The nine types of ink used in the present exemplary embodiment are cyan (C), magenta (M), yellow (Y), black (K), pale cyan (PC), pale magenta (PM), and gray (GY) inks, a reactive liquid (T), and a gloss improvement liquid (G).

The carriage 31 supports the plurality of recording heads 30. Each of the recording heads 30 is fixed to the carriage 31 at its ink discharge surface-side end. The gap between the ink discharge surface and the surface of the transfer member 2 can thereby be maintained more precisely. The carriage 31 is configured to be displaceable with the recording heads 30 mounted thereon, being guided by guide members RL. In the present exemplary embodiment, the guide members RL are rail members extended in the Y direction. A pair of guide members RL is arranged apart from each other in the X direction. Slide portions 32 are provided on sides of the carriage 31 in the X direction. The slide portions 32 are engaged with the guide members RL and slide along the guide members RL in the Y direction.

<Transfer Unit>

The transfer unit 4 will be described with reference to FIG. 1. The transfer unit 4 includes a transfer drum 41 and a pressure drum 42. The drums 41 and 42 are rotating members rotating about respective rotation axes extending in the Y direction. The drums 41 and 42 each have a cylindrical outer peripheral surface. In FIG. 1, the arrows drawn inside the figures of the transfer drum 41 and the pressure drum 42 indicate the rotation directions of the drums 41 and 42. The transfer drum 41 rotates clockwise, and the pressure drum 42 counterclockwise.

The transfer drum 41 is a support member that supports the transfer member 2 on its outer peripheral surface. The transfer member 2 is continuously or discretely provided in a circumferential direction on the outer peripheral surface of the transfer drum 41. In the case of the continuous configuration, the transfer member 2 is formed in an endless belt shape. In the case of the discrete configuration, the transfer member 2 is formed as a plurality of separate belt-like segments with ends. The segments can be arranged on the outer peripheral surface of the transfer drum 41 at equal pitches in an arc-like shape.

Rotation of the transfer drum 41 cyclically moves the transfer member 2 on a circular orbit. Depending on the rotational phase of the transfer drum 41, the position of the transfer member 2 can be classified into a discharge preprocessing region R1, a discharge region R2, discharge post-processing regions R3 and R4, a transfer region R5, and a transfer post-processing region R6. The transfer member 2 passes cyclically through the regions R1 to R6.

The discharge preprocessing region R1 is a region where the transfer member 2 is subjected to preprocessing before the discharge of ink by the recording unit 3. In the discharge preprocessing region R1, the peripheral unit 5A performs processing. In the present exemplary embodiment, the peripheral unit 5A applies the reactive liquid to the transfer member 2. The discharge region R2 is a region where the recording unit 3 discharges ink to the transfer member 2 to form an ink image. The discharge post-processing regions R3 and R4 are processing regions where the ink image is subjected to processing after the discharge of the ink. The discharge post-processing region R3 is a region where the peripheral unit 5B performs processing. The discharge post-processing region R4 is a region where the peripheral unit 5C performs processing. The transfer region R5 is a region where the ink image on the transfer member 2 is transferred to a recording medium P by the transfer unit 4. The transfer post-processing region R6 is a region where the transfer member 2 is subjected to post-processing after the transfer. In the transfer post-processing region R6, the peripheral unit 5D performs processing.

In the present exemplary embodiment, the discharge region R2 is a region extending over a certain distance. The other regions R1 and R3 to R6 each extend over a narrower distance than that of the discharge region R2. Compared to a clock face, the discharge preprocessing region R1 in the present exemplary embodiment is located at around ten. The discharge region R2 ranges approximately from eleven to one. The discharge post-processing region R3 is located at around two, and the discharge post-processing region R4 is located at around four. The transfer region R5 is located at around six, and the transfer post-processing region R6 is located at around eight.

The transfer member 2 may be configured as a single layer or a laminated body of a plurality of layers. In the case of the plurality of layers, the transfer member 2 may include, for example, three layers including a surface layer, an elastic layer, and a compression layer. The surface layer is the outermost layer having an image formation surface on which an ink image is formed. The compression layer, if provided, can absorb deformation and disperse local pressure variations to maintain transferability even during high speed recording. The elastic layer is an intermediate layer between the surface layer and the compression layer.

Various materials such as a resin and a ceramic material can be suitably used as the material of the surface layer. In view of durability, materials having a high compressive elasticity modulus can be used. Specific examples include acrylic resins, acrylic silicone resins, fluorine-containing resins, and condensates obtained by condensing hydrolytic organosilicon compounds. To improve wettability to the reactive liquid and image transferability, surface treatment may be applied to the surface layer. Examples of the surface treatment include flame treatment, corona treatment, plasma treatment, polishing, roughening, active energy ray irradiation, ozone treatment, surfactant treatment, and silane coupling treatment. More than one of such surface treatments may be applied in combination. Any other surface shape may be formed on the surface layer.

Examples of the material of the compression layer include acrylonitrile-butadiene rubber, acrylic rubber, chloroprene rubber, urethane rubber, and silicone rubber. In forming such a rubber material, a predetermined amount of vulcanizing agent and/or vulcanization accelerator may be mixed in. A foaming agent and/or a filler such as hollow fine particles and salt may further be mixed in as needed to form a porous rubber material. The resulting bubble portions are compressed to change in volume under various pressure changes. This can reduce deformation other than in the direction of compression and provide more stable transferability and durability. Porous rubber materials include ones having an open pore structure in which pores are continuous with each other, and ones having a closed pore structure in which pores are independent of each other. Either structure may be used. Both the structures may be used in combination.

Various materials such as a resin and a ceramic material can be suitably used as the material of the elastic layer. In view of processing characteristics, various elastomer materials and rubber materials can be used. Specific examples include fluorosilicone rubber, phenyl silicone rubber, fluorocarbon rubber, chloroprene rubber, urethane rubber, and nitrile rubber. Other examples include ethylene propylene rubber, natural rubber, styrene rubber, isoprene rubber, butadiene rubber, ethylene/propylene/butadiene copolymer, and nitrile butadiene rubber. In particular, silicone rubber, fluorosilicone rubber, and phenyl silicone rubber have a low compression set and are advantageous in terms of dimension stability and durability. Such rubbers do not make much change in the elasticity modulus with temperature and are also advantageous in terms of transferability.

For a purpose of fixing, various adhesives and double-sided tapes may be used between the surface layer and the elastic layer and between the elastic layer and the compression layer. The transfer member 2 may include a reinforcement layer having a high compression elasticity modulus to suppress lateral elongation when attached to the transfer drum 41 and to maintain resilience. Woven fabric may be used as the reinforcement layer. The transfer member 2 can be fabricated by combining the layers of the foregoing materials.

The outer peripheral surface of the pressure drum 42 is pressed against the transfer member 2. At least one gripping mechanism for holding a leading edge portion of the recording medium P is provided on the outer peripheral surface of the pressure drum 42. A plurality of gripping mechanisms may be provided at distances from each other in a circumferential direction of the pressure drum 42. The recording medium P is conveyed in close contact with the outer peripheral surface of the pressure drum 42 and passes through a nip portion between the pressure drum 42 and the transfer member 2 when the ink image on the transfer member 2 is transferred thereto.

<Peripheral Units>

The peripheral units 5A to 5D are arranged around the transfer drum 41. In the present exemplary embodiment, the peripheral units 5A, 5B, 5C, and 5D are an application unit, an absorption unit, a heating unit, and a cleaning unit, respectively.

The application unit 5A is a mechanism for applying the reactive liquid to the transfer member 2 before the discharge of ink by the recording unit 3. The reactive liquid is a liquid containing a component for increasing ink viscosity. Increasing ink viscosity refers to causing a color material or resin constituting the ink to come into contact with and chemically react with, or physically adhere to, the component for increasing ink viscosity so that the viscosity of the ink is observed to increase. The increasing of ink viscosity is not limited to cases where the viscosity of the entire ink is observed to increase, but also covers cases where part of the components constituting the ink, such as a color material and resin, coagulates to cause a local increase in viscosity.

The component for increasing ink viscosity is not limited in particular. Examples include metal ions and polymer coagulants. A substance that causes a change in the pH of the ink to coagulate the color material in the ink can be used. An organic acid may be used. Examples of the mechanism for applying the reactive liquid include a roller, a recording head, a die coating apparatus (die coater), and a blade coating apparatus (blade coater). If the reactive liquid is applied to the transfer member 2 before the discharge of ink to the transfer member 2, the ink reaching the transfer member 2 can be immediately fixed. This can suppress bleeding, i.e., mixing up of adjoining inks.

The absorption unit 5B is a mechanism for absorbing a liquid component from the ink image on the transfer member 2 before transfer. Reducing the liquid component of the ink image can suppress bleeding of the image recorded on the recording medium P. To put it another way, reducing the liquid component can also be expressed as condensing the ink constituting the ink image on the transfer member 2. The condensing of ink means that the liquid component included in the ink decreases so that a ratio of solid contents, such as a color material and resin, included in the ink to the liquid component increases.

For example, the absorption unit 5B includes a liquid absorption member that makes contact with the ink image to reduce an amount of the liquid component in the ink image. The liquid absorption member may be formed on the outer peripheral surface of a roller. The liquid absorption member may also be formed in an endless sheet shape and run to circulate. In view of protection of the ink image, the moving speed of the liquid absorption member may be set to coincide with a circumferential speed of the transfer member 2 so that the liquid absorption member and the transfer member 2 move synchronously.

The liquid absorption member may include a porous body that contacts the ink image. To suppress adhesion of solid contents of the ink to the liquid absorption member, the porous member may have a pore size of 10 µm or less at the surface contacting the ink image. As employed herein, the pore size refers to an average diameter. The pore size can be measured by known means such as mercury intrusion technique, nitrogen adsorption method, and scanning electron microscope (SEM) image observation. The liquid component is not limited in particular as long as the liquid component has no definite shape, has fluidity, and has a nearly constant volume. Examples of the liquid component include water and an organic solvent included in the ink or the reactive liquid.

The heating unit 5C is a mechanism for heating the ink image on the transfer member 2 before transfer. Heating the ink image melts the resin in the ink image to improve transferability to the recording medium P. The heating temperature can be set at the minimum film-forming temperature (MFT) or above of the resin. The MFT can be measured by a known method, for example, by using an apparatus compliant with Japanese Industrial Standard (JIS) K 6828-2:2003 or the International Organization for Standardization (ISO) 2115:1996. In view of transferability and image robustness, the ink image may be heated to a temperature that is 10° C. or more higher than the MFT. Further, the ink image may be heated to a temperature that is 20° C. or more higher than the MFT. Conventional heating devices such as an infrared and other lamps and warm air fans can be used as the heating unit 5C. In view of heating efficiency, an infrared heater can be used.

The cleaning unit 5D is a mechanism for cleaning the surface of the transfer member 2 after transfer. The cleaning unit 5D removes ink remaining on the transfer member 2 and dust on the transfer member 2. The cleaning unit 5D can use a known method as appropriate, such as a method for bringing a porous member into contact with the transfer member 2, a method for rubbing the surface of the transfer member 2 with a brush, and a method for scraping the surface of the transfer member 2 with a blade. A cleaning member of a conventional shape such as a roller shape and a web shape can be used for cleaning.

As described above, in the present exemplary embodiment, the application unit 5A, the absorption unit 5B, the heating unit 5C, and the cleaning unit 5D are provided as the peripheral units. Some of the units may have an additional function of cooling the transfer member 2, or a cooling unit may be added. In the present exemplary embodiment, the transfer member 2 can increase in temperature due to the heat from the heating unit 5C. The liquid component absorption performance of the absorption unit 5B can drop if the ink image exceeds the boiling point of water, which is the main solvent of the ink, after the discharge of the ink to the transfer member 2 by the recording unit 3. The liquid component absorption performance can be maintained by cooling the transfer member 2 so that the discharged ink is kept below the boiling point of water.

The cooling unit may be a blower mechanism for blowing air to the transfer member 2, or a mechanism for bringing a member (for example, a roller) into contact with the transfer member 2 and air- or water-cooling the member. Alternatively, the cooling unit may be a mechanism for cooling the cleaning member of the cleaning unit 5D. Cooling timing may be after transfer and before application of the reactive liquid.

<Supply Unit>

The supply unit 6 is a mechanism for supplying ink to the recording heads 30 of the recording unit 3. The supply unit 6 may be arranged on a rear side of the recording system 1. The supply unit 6 includes reservoir units TK each storing a different type of ink. In the present exemplary embodiment, the supply unit 6 includes nine reservoir units TK corresponding to the nine types of ink.

The reservoir units TK communicate with the respective recording heads 30 via channels 6a. The inks are supplied from the reservoir units TK to the recording heads 30. The channels 6a may be ones for circulating the inks between the reservoir units TK and the recording heads 30. The supply unit 6 may include a pump for circulating the inks. Deaeration mechanisms for deaerating bubbles in the inks may be provided on the channels 6a or in the reservoir units TK. Valves for regulating the liquid pressures of the inks with respect to the air pressure may be provided on the channels 6a or in the reservoir units TK. The heights of the reservoir units TK and the recording heads 30 in the Z direction may be designed so that surface levels of the inks in the reservoir units TK are located below the ink discharge surfaces of the recording heads 30.

Figure 4:
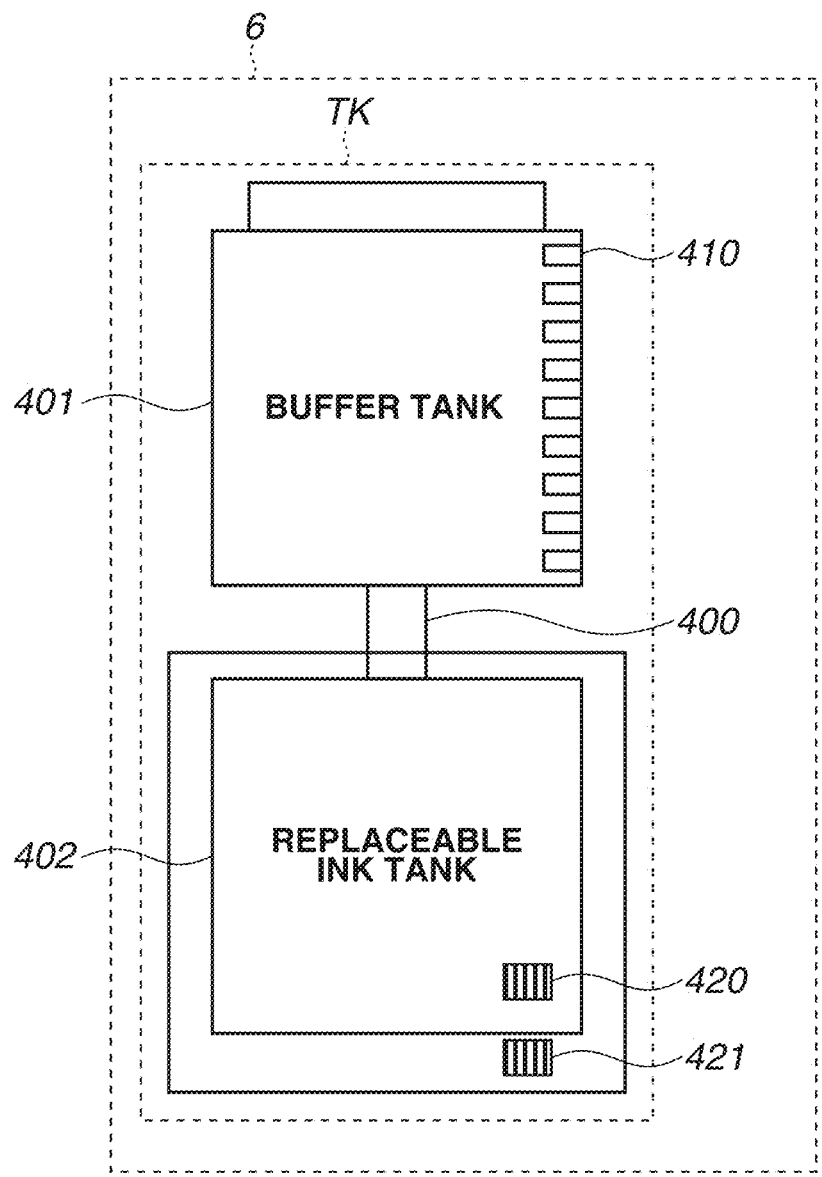
FIG. 4 is a diagram illustrating a configuration of a reservoir unit of FIG. 1.

FIG. 4 is a diagram illustrating the reservoir unit TK. The reservoir unit TK includes a buffer tank 401 and a replaceable ink tank 402. The reservoir unit TK includes a mounting unit (not illustrated) for detachably mounting the replaceable ink tank 402. An empty replaceable ink tank 402 is detached from the not-illustrated mounting unit, and a new replaceable ink tank 402 is mounted thereon for replacement. At this time, a two-dimensional barcode to be described below is read to acquire information indicating that a state in which no replaceable ink tank 402 is mounted on the mounting unit has changed to a state in which the replaceable ink tank 402 is mounted. The buffer tank 401 communicates with the replaceable ink tank 402 via a channel 400.

As employed herein, an operation for moving the ink stored in the replaceable ink tank 402 to the buffer tank 401 will be referred to as a moving operation. In the present exemplary embodiment, if the moving operation is started, a not-illustrated forced movement unit such as a pump is driven, and all the ink stored in the replaceable ink tank 402 is suctioned up and moved to the buffer tank 401 at a time. The moving operation ends if there is no more ink stored in the replaceable ink tank 402.

<Conveyance Apparatus>

The conveyance apparatus 1B is an apparatus that feeds a recording medium P to the transfer unit 4 and discharges a recording product P' to which an ink image is transferred from the transfer unit 4. The conveyance apparatus 1B includes a feed unit 7, a plurality of conveyance drums 8 and 8a, two sprockets 8b, a chain 8c, and a collection unit 8d. In FIG. 1, the arrows drawn inside the figures of the components of the conveyance apparatus 1B indicate the rotation directions of the components. The arrows outside the figures of the components indicate the conveyance path of the recording medium P or the recording product P'. The recording medium P is conveyed from the feed unit 7 to the transfer unit 4. The recording product P' is conveyed from the transfer unit 4 to the collection unit 8d. A side of the feed unit 7 in the conveyance direction is referred to as an upstream side, and a side of the collection unit 8d is referred to as a downstream side.

The feed unit 7 includes a stacking unit on which a plurality of recording media P is stacked, and a feeding mechanism for feeding the recording media P one by one from the stacking unit to the most upstream conveyance drum 8. The conveyance drums 8 and 8a are rotating members rotating about respective rotation axes extending in the Y direction. The conveyance drums 8 and 8a each have a cylindrical outer peripheral surface. At least one gripping mechanism for holding a leading edge portion of the recording medium P (or the recording product P') is provided on the outer peripheral surface of each of the conveyance drum 8 and 8a. A gripping operation and releasing operation of the gripping mechanism are controlled so that the recording medium P (or the recording product P') is passed over between adjoining conveyance drums.

The two conveyance drums 8a are intended to reverse the recording medium P. In a case where two-sided recording is performed on the recording medium P, the recording medium P after transfer onto the front side is not delivered from the pressure drum 42 to the conveyance drum 8 adjoining downstream but to the conveyance drum 8a. The recording medium P is reversed via the two conveyance drums 8a and delivered to the pressure drum 42 again via the conveyance drum 8 on the upstream side of the pressure drum 42. As a result, the back side of the recording medium P faces the transfer drum 41, and an ink image is transferred to the back side.

The chain 8c is wound around the two sprockets 8b. One of the two sprockets 8b is a driving sprocket, and the other is a driven sprocket. Rotation of the driving sprocket runs the chain 8c to circulate. A plurality of gripping mechanisms is arranged on the chain 8c longitudinally at a distance from each other. The gripping mechanisms grip an end portion of a recording product P'. The recording product P' is delivered from the conveyance drum 8 located at the downstream end to the gripping mechanism on the chain 8c. The recording product P' gripped by the gripping mechanism is conveyed to the collection unit 8d by the running of the chain 8c, and the gripping is released. In such a manner, recording products P' are stacked in the collection unit 8d.

<Post-Processing Unit>

The conveyance apparatus 1B includes post-processing units 10A and 10B. The post-processing units 10A and 10B are mechanisms that are arranged downstream of the transfer unit 4 and perform post-processing on the recording product P'. The post-processing unit 10A performs processing on the front side of the recording product P'. The post-processing unit 10B performs processing on the back side of the recording product P'. Examples of the processing include application of coating intended for image protection or gloss finishing to the image recording surface of the recording product P'. Examples of the coating include application of a liquid, adhesion of a sheet, and lamination.

<Inspection Unit>

The conveyance apparatus 1B includes inspection units 9A and 9B. The inspection units 9A and 9B are mechanisms that are arranged downstream of the transfer unit 4 and inspect the recording product P'.

In the present exemplary embodiment, the inspection unit 9A is an imaging device for capturing an image of the image recorded on the recording product P'. Examples include image sensors such as a charge-coupled device (CCD) sensor and a complementary metal-oxide-semiconductor (CMOS) sensor. The inspection unit 9A captures an image of a recording image while a recording operation is continuously performed. Based on the images captured by the inspection unit 9A, the recording image can be checked for a temporal change in tint and the like, and whether to correct the image data or recording data can be determined. In the present exemplary embodiment, an imaging range of the inspection unit 9A is set to the outer peripheral surface of the pressure drum 42 so that an image of a part of the recording image immediately after transfer can be captured. The inspection unit 9A may perform inspection on all the recording images. Alternatively, the inspection unit 9A may perform inspection at each predetermined number of recording images.

In the present exemplary embodiment, the inspection unit 9B is also an imaging device for capturing an image of the image recorded on the recording product P'. Examples include image sensors such as a CCD sensor and a CMOS sensor. The inspection unit 9B captures the image of the recording image in a test recording operation. The inspection unit 9B captures the image of the entire recording image, and based on the image captured by the inspection unit 9B, basic settings for various corrections concerning the recording data can be made. In the present exemplary embodiment, the inspection unit 9B is arranged at a position where an image of the recording product P' conveyed by the chain 8c can be captured. In capturing the image of the recording image by the inspection unit 9B, the running of the chain 8c is temporarily stopped and the inspection unit 9B captures the image of the entire recording image. The inspection unit 9B may also be a scanner for scanning the recording product P'.

<Control Unit>

Figure 3:
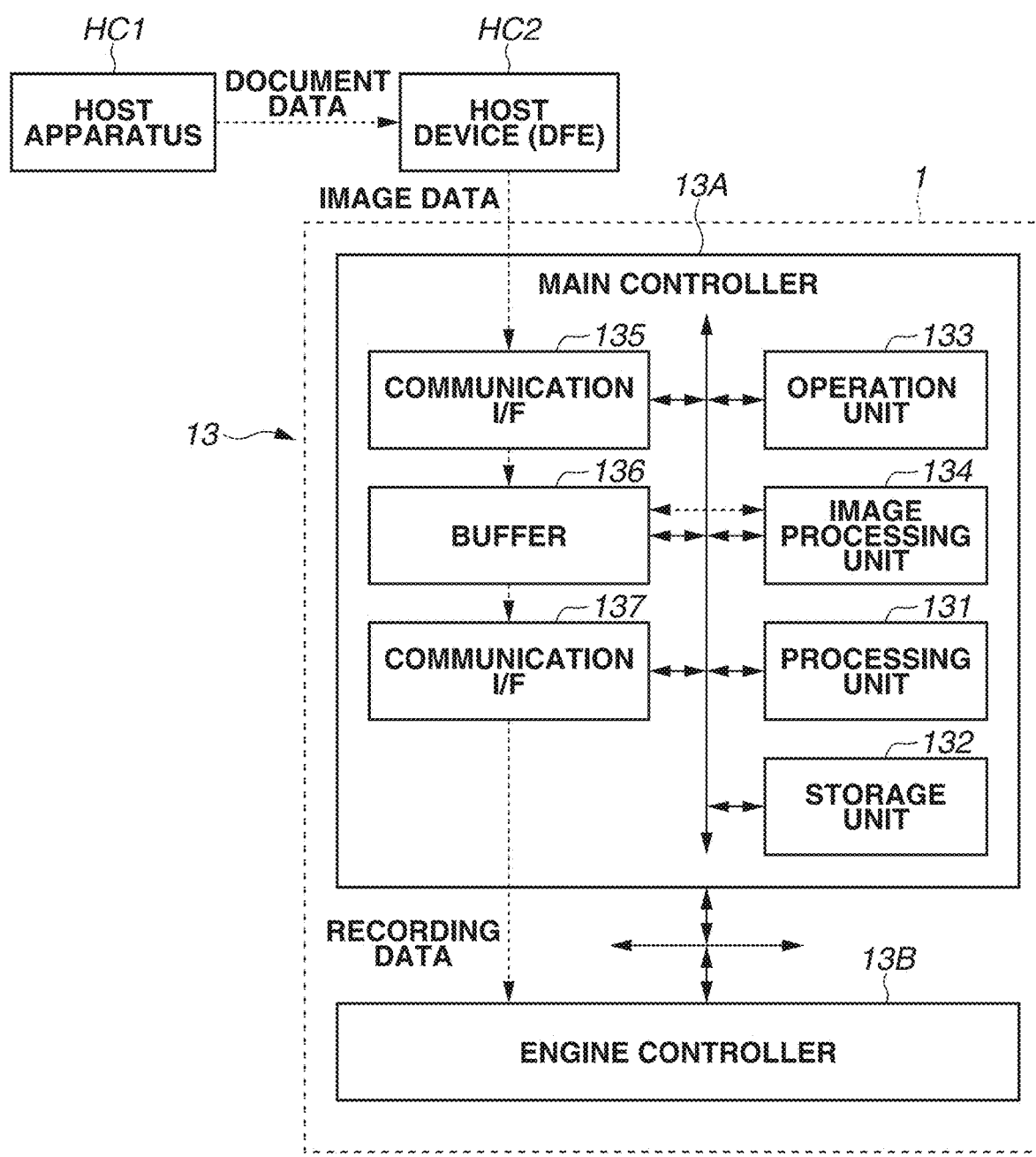
FIG. 3 is a block diagram illustrating a control system of the recording system of FIG. 1.

Next, a control unit of the recording system 1 will be described. FIG. 3 is a block diagram illustrating a control unit 13 of the recording system 1. The control unit 13 is communicably connected to a host device (digital front end (DFE)) HC2. The host device HC2 is communicably connected to a host apparatus HC1.

The host apparatus HC1 generates or stores document data from which a recording image is generated. For example, the document data here is generated in a form of an electronic file such as a document file and an image file. The document data is transmitted to the host device HC2. The host device HC2 converts the received document data into a data format usable by the control unit 13 (for example, red-green-blue (RGB) data expressing an image in RGB). The converted data is transmitted as image data from the host device HC2 to the control unit 13. The control unit 13 starts a recording operation based on the received image data.

In the present exemplary embodiment, the control unit 13 is broadly divided into a main controller 13A and an engine controller 13B. The main controller 13A includes a processing unit 131, a storage unit 132, an operation unit 133, an image processing unit 134, a communication interface (I/F) 135, a buffer 136, and a communication I/F 137.

The processing unit 131 is a processor such as a central processing unit (CPU). The processing unit 131 executes a program stored in the storage unit 132 to control the entire main controller 13A. The storage unit 132 is a storage device such as a random access memory (RAM), a read-only memory (ROM), a hard disk, and a solid state drive (SSD). The storage unit 132 stores the program to be executed by the processing unit 131 and data, and provides a work area for the processing unit 131. The operation unit 133 is a user interface (UI) including a display unit for displaying a message to a user and an input device for accepting an instruction and an input from the user. Examples include a touch panel, a keyboard, and a mouse. The operation unit 133 also includes a reading device such as a barcode reader for reading a two-dimensional barcode attached to each of the replaceable ink tank 402 and the mounting unit of a recording apparatus main body on which the replaceable ink tank 402 is mounted. The two-dimensional barcode will be described below.

An example of the image processing unit 134 is a device including an image processor. Details of the image processing unit 134 will be described below. Examples of the buffer 136 include a RAM, a hard disk, and an SSD. The communication I/F 135 communicates with the host device HC2. The communication I/F 137 communicates with the engine controller 13B. In FIG. 3, broken-lined arrows indicate a flow of processing of the image data. The image data received from the host device HC2 via the communication I/F 135 is accumulated in the buffer 136. The image processing unit 134 reads the image data from the buffer 136, applies predetermined image processing to the read image data, and stores the resultant in the buffer 136 again. The image data stored in the buffer 136 after the image processing is transmitted from the communication I/F 137 to the engine controller 13B as recording data to be used by a print engine.

In the exemplary embodiment described above, the recording unit 3 includes a plurality of recording heads 30. Alternatively, the recording unit 3 may include a single recording head 30. The recording heads 30 do not need to be full-line heads. Alternatively, the recording heads 30 may be serial type heads that form an ink image by scanning in the Y direction.

The mechanism for conveying the recording medium P may use other methods such as pinching and conveying the recording medium P by a roller pair. In the method for conveying the recording medium P by the roller pair, a roll sheet may be used as the recording medium P. After transfer, the roll sheet may be cut to manufacture the recording product P'.

In the exemplary embodiment described above, the transfer member 2 is provided on the outer peripheral surface of the transfer drum 41. However, other methods may be used. For example, the transfer member 2 may be formed in an endless belt shape and run to circulate.

FIG. 4 is a diagram illustrating a configuration of the supply unit 6 according to the present exemplary embodiment. The reservoir unit TK includes the buffer tank 401 and the replaceable ink tank 402. Nine float sensors 410 are installed inside the buffer tank 401, whereby the remaining ink amount in the buffer tank 401 can be detected in nine levels. Information indicating the remaining ink amount in the buffer tank 401 is acquired as a float sensor level and stored in the storage unit 132. The storage unit 132 stores information indicating a tank state of the replaceable ink tank 402. The storage unit 132 includes as many storage areas for that purpose as the number of replaceable ink tanks 402. In the present exemplary embodiment, the storage unit 132 stores information indicating the tank states of nine replaceable ink tanks 402 since nine types of inks are used. Each piece of the information indicates any one of three tank states "full", "moving", and "empty". The tank states transition independently tank by tank.

The replaceable ink tank 402 is a tank that can be replaced by the user. A replacing operation is performed by detaching an empty replaceable ink tank from the mounting unit and mounting a new replaceable ink tank. A two-dimensional barcode 420 is attached to a main body of the replaceable ink tank 402. A two-dimensional barcode 421 is attached to the mounting unit on which the replaceable ink tank 402 is mounted. The two-dimensional barcodes 420 and 421 contain information such as an identifier, name, lot number, and unique serial number. The replaceable ink tank 402 does not include means for detecting the remaining ink amount, such as a sensor. For example, a container called a bag-in-box is used as the replaceable ink tank 402. A bag-in-box is a combined liquid container including an inner container made of plastic and an outer container composed mainly of a corrugated cardboard box. Such a container typically includes no mechanism for detecting the remaining ink amount.

Next, a procedure in replacing the replaceable ink tank 402 will be described. The user detaches an empty replaceable ink tank 402 from which ink has been moved from the mounting unit. Then, the user installs a new replaceable ink tank 402 containing a predetermined amount of ink in its installation position and mounts the replaceable ink tank 402 on the mounting unit of the recording apparatus main body. Then, the user reads both the two-dimensional barcode 420 attached to the main body of the replaceable ink tank 402 and the two-dimensional barcode 421 attached to the mounting unit of the recording apparatus main body by using a barcode reader included in the operation unit 133. After the reading, the user presses a corresponding replacement completion button 600 on the UI of the operation unit 133 illustrated in FIG. 6. The main controller 13A determines that a state in which no replaceable ink tank is mounted on the mounting unit has changed to a state in which the replaceable ink tank is mounted on the mounting unit, and updates the information about the tank state of the replaceable ink tank 402 stored in the storage unit 132 with information indicating "full". At the timing when the replacement completion button 600 is pressed by the user, new information such as charging information, the date and time of replacement, and the number of times of replacement is stored into the storage unit 132. The update of the information about the tank state may be triggered by the reading of the two-dimensional barcodes 420 and 421 or by the pressing of the replacement completion button 600.

The moving operation from the replaceable ink tank 402 to the buffer tank 401 will be described. As described above, in the present exemplary embodiment, if the moving operation is started, all the ink stored in the replaceable ink tank 402 is moved to the buffer tank 401 at a time. The information indicating the tank state of the replaceable ink tank 402 is expressed in three levels "full", "moving", and "empty". The level value (float sensor level) detected by the float sensors 410 provided in the buffer tank 401 is also used to determine whether the moving operation from the replaceable ink tank 402 to the buffer tank 401 is being properly performed.

In the present exemplary embodiment, suppose that if all the ink in the replaceable ink tank 402 is moved to the buffer tank 401, the level value detected by the float sensors 410 increases by two levels. The time needed for the level value detected by the float sensors 410 to increase by one level in a case where the moving operation is properly performed is acquired in advance. With reference to the time, the time needed to move all the ink stored in the replaceable ink tank 402 is calculated, and a timeout time is set in advance by taking the calculated time into account.

Initially, a level of the ink in the buffer tank 401 is detected. As described above, since all the ink stored in the replaceable ink tank 402 is moved in the moving operation according to the present exemplary embodiment, the ink in the replaceable ink tank 402 cannot be moved to the buffer tank 401 unless there is a room greater than or equal to an amount equivalent to all the ink in the replaceable ink tank 402. Accordingly, if the detected ink level of the buffer tank 401 is at a higher level than a predetermined level, the moving operation to move the ink in the replaceable ink tank 402 to the buffer tank 401 is not performed. Then, after the ink in the buffer tank 401 decreases due to recording of an image and the ink level of the buffer tank 401 is detected to be at a lower level than the predetermined level, the moving operation to move all the ink in the replaceable ink tank 402 is performed. The information indicating the tank state of the replaceable ink tank 402 stored in the storage unit 132 is acquired at timing when the float sensors 410 detect that the ink level of the buffer tank 401 is at a predetermined level or below. If the acquired information indicates "empty", a message prompting the user to replace the replaceable ink tank 402 is displayed on the UI of the operation unit 133. If the acquired information indicates "full", the replaceable ink tank 402 is determined to be in a moving ready state, and the moving operation from the replaceable ink tank 402 to the buffer tank 401 via the channel 400 is started. If the moving operation is started, the information indicating the tank state stored in the storage unit 132 is changed to "moving", and all the ink stored in the replaceable ink tank 402 is moved to the buffer tank 401. If a predetermined amount of ink is moved to the buffer tank 401 and the replaceable ink tank 402 becomes empty, the information indicating the tank state of the replaceable ink tank 402 is changed to information indicating "empty", and the moving operation is completed. Once the moving operation is completed and the information indicating the tank state is changed to "empty", ink will not be moved again from the replaceable ink tank 402 mounted at that time. Only if the replacement completion button 600 is pressed on the UI, the replaceable ink tank 402 enters the moving ready state so that the moving operation from the replaceable ink tank 402 to the buffer tank 401 can be performed at any time.

A timer is activated at the timing when the moving operation is started. If an appropriate increase in the ink level is not detected by the float sensors 410 after a lapse of the timeout time set in advance, it is determined that the moving of the ink is not properly being performed, and an error indication is displayed on the UI. On the other hand, if the ink level is detected to have increased by two levels from the start of the moving operation and then the timeout time elapses without a further increase in the ink level, it is determined that the moving operation is properly performed, and driving of the pump is stopped. When the moving operation is completed, the information indicating the tank state of the replaceable ink tank 402 stored in the storage unit 132 is changed to information indicating "empty". A warning prompting replacement of the replaceable ink tank 402 is displayed on the UI for the sake of user notification.

Figure 5:
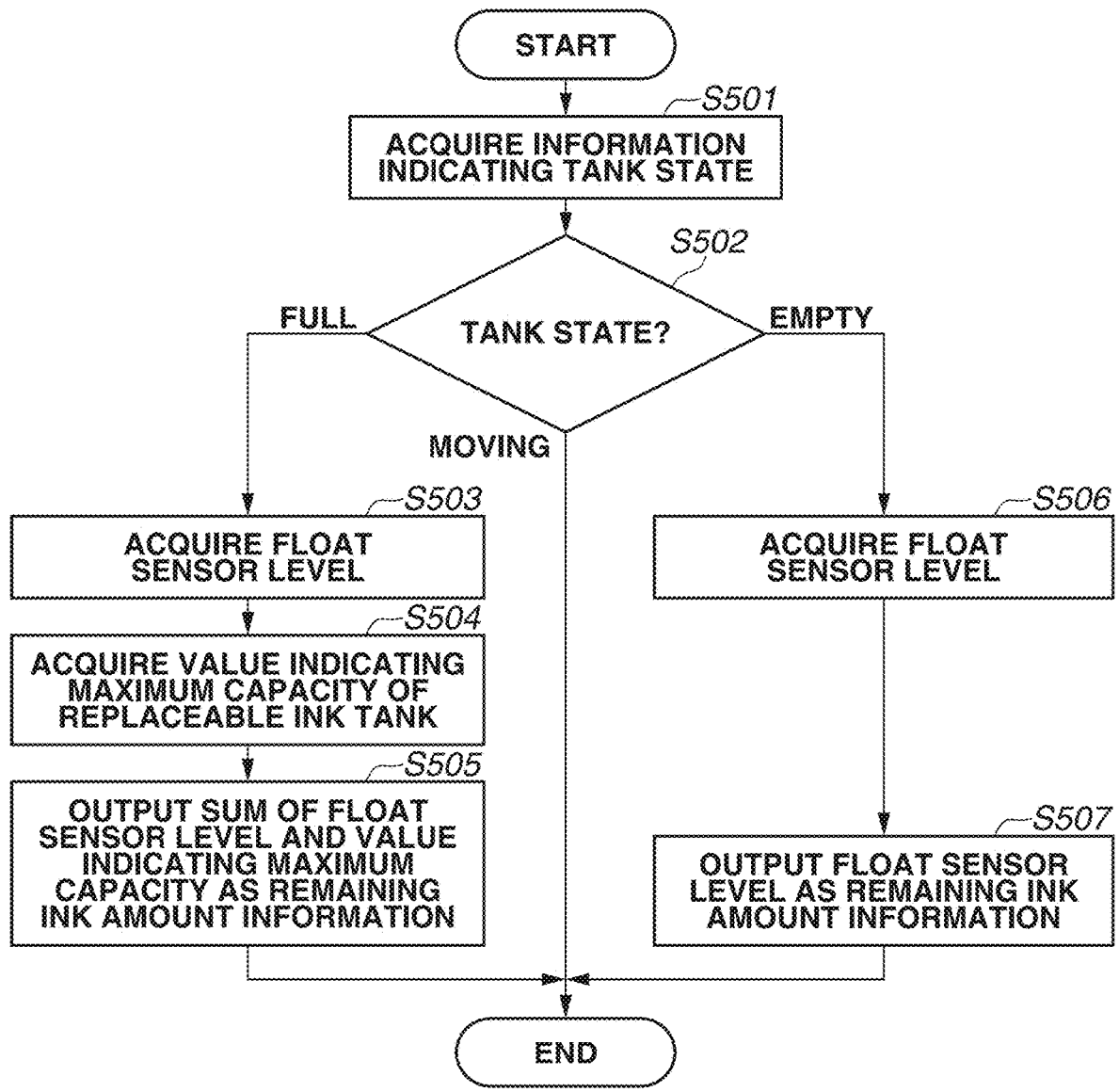
FIG. 5 is a flow chart illustrating a remaining ink amount display control.

FIG. 5 is a flow chart illustrating a remaining ink amount display control according to the present exemplary embodiment. This sequence may be started periodically or triggered by a specific event such as a transition to a remaining ink amount display screen. For example, if the update cycle of the screen is two seconds, the sequence is started at every two seconds after the transition to the remaining ink amount display screen. The following remaining ink amount display control is performed for each of the reservoir units TK.

In step S501, the processing unit 131 acquires the information indicating the tank state of the replaceable ink tank 402 stored in the storage unit 132.

In step S502, the processing unit 131 determines whether the information indicating the tank state acquired in step S501 is "full", "moving", or "empty". If the information indicating the tank state is determined to be "full" (FULL in step S502), the processing proceeds to step S503. In step S503, the processing unit 131 acquires the float sensor level indicating the remaining ink amount of the buffer tank 401. As described above, the float sensor level has nine levels. The processing proceeds to step S504. In step S504, the processing unit 131 acquires a value indicating a predetermined maximum capacity of the replaceable ink tank 402 previously stored in the storage unit 132. If the information indicating the tank state of the replaceable ink tank 402 is "full", the replaceable ink tank 402 is considered to contain that amount of ink. The value acquired in step S504 is used for the subsequent calculation of the remaining ink amount.

In step S505, the processing unit 131 adds the value (float sensor level) acquired in step S503 and the value acquired in step S504, and outputs the sum to the display unit as remaining ink amount information. The float sensor level of the buffer tank 401 acquired in step S503 may be converted into a numerical value corresponding to the remaining ink amount using a unit such as liter before being added to the value indicating the maximum capacity of the replaceable ink tank 402. The values may be added after being converted into an output format intended for the display unit. Other formats may also be used.

In step S502, if the information indicating the tank state of the replaceable ink tank 402 is determined to be "empty" (EMPTY in step S502), the processing proceeds to step S506. In step S506, the processing unit 131 acquires the float sensor level indicating the remaining ink amount of the buffer tank 401. The processing of step S506 is similar to that of the foregoing step S503. In step S507, the processing unit 131 outputs a value corresponding to the acquired float sensor level to the display unit as the remaining ink amount information.

In step S502, if the information indicating the tank state of the replaceable ink tank 402 is determined to be "moving" (MOVING in step S502), the processing ends. The remaining ink amount display (remaining ink amount information) output to the display unit continues to display the value at or immediately before the start of the moving operation. The reason is that there is no means for directly detecting the remaining ink amount of the replaceable ink tank 402, and the remaining ink amount is determined in two levels "full" and "empty" based on information from the user, whereas the float sensor level of the buffer tank 401 is detected in nine levels. The remaining ink amount display on the display unit can be changed stepwise even during the moving operation by using the float sensors 410 provided in the buffer tank 401. However, since the replaceable ink tank 402 includes no sensor, the remaining amount of ink in the replaceable ink tank 402 during the moving operation is unable to be figured out. If the sum is displayed during the moving operation by using the method of steps S503 to S505, the full storage amount of the replaceable ink tank 402 is added to the remaining ink amount of the buffer tank 401 that is performing the moving operation. The resulting amount displayed is greater than the sum of the actual ink amounts of the buffer tank 401 and the replaceable ink tank 402. In other words, the displayed amount is not correct. On the other hand, if the remaining ink amount of the buffer tank 401 alone is displayed during the moving operation by the method of steps S506 and S507, the displayed amount is less than the sum of the actual ink amounts. In view of this, the processing unit 131 continues to simply display the value at the start of the moving operation, i.e., the value displayed immediately before execution of the moving operation, on the UI to maintain a constant value while the information indicating the tank state is "moving". The reason is that the ink is simply moving between the tanks during the moving operation, and the total amount of ink stored in the two tanks remains unchanged. After the moving operation is completed and the information indicating the tank state is changed to "empty", the display method of steps S506 and S507 is performed.

Next, state transitions of the information indicating the tank state of the replaceable ink tank 402 stored in the storage unit 132 will be described. Initially, if the moving operation from the replaceable ink tank 402 to the buffer tank 401 is started, the engine controller 13B notifies the main controller 13A of the start of the moving operation. In response, the information indicating the tank state is changed to "moving". Next, whether the moving operation is properly performed is determined as described above. If the moving operation is determined to be properly performed, the information indicating the tank state is changed to "empty". Subsequently, the information indicating the tank state is changed to "full" when the replacement completion button 600 is pressed on the UI as described above. If the ink is consumed and the float sensors 410 detect that the remaining ink amount of the buffer tank 401 is at a predetermined level or below, the moving operation from the replaceable ink tank 402 to the buffer tank 401 is started, and the information indicating the tank state returns to the initial state.

Figure 6:
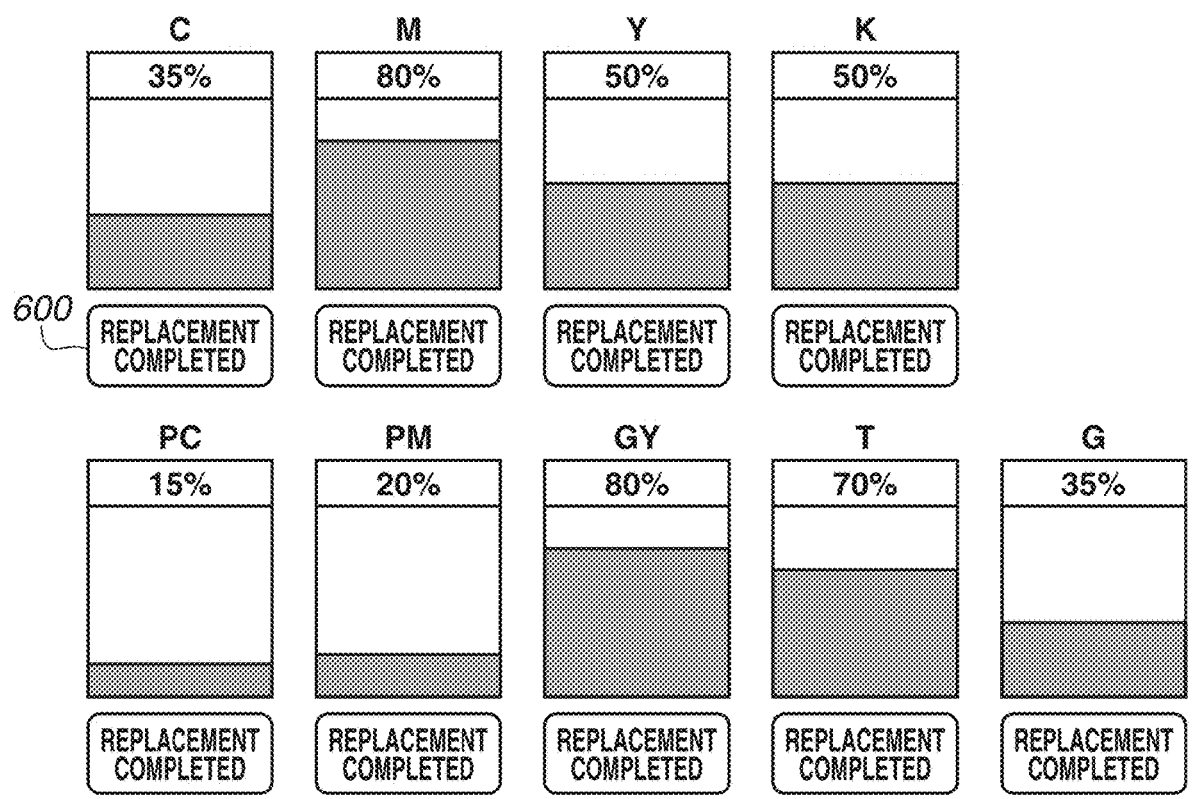
FIG. 6 is a diagram illustrating a user interface (UI) display example of a remaining ink amount display.

FIG. 6 illustrates an UI display example of the remaining ink amount display according to the present exemplary embodiment. The remaining ink amount display is performed for each of the nine types of ink. A color name, a numerical representation of the remaining ink amount, and a graphic image of the remaining ink amount are displayed for each of the types of ink. FIGS. 7A, 7B, 7C, and 7D are conceptual diagrams illustrating transitions of the UI display.

In FIG. 6, the replacement completion buttons 600 are buttons for the user to press when completing replacement of the replaceable ink tanks 402. The graphic image of the remaining ink amount of each color will be described in detail below. In FIGS. 7A, 7B, 7C, and 7D, a display section 701 represents the remaining ink amount of the buffer tank 401. A display section 702 represents the remaining ink amount of the replaceable ink tank 402. A line 703 indicates the sum of the remaining ink amounts of the two tanks. In FIGS. 7A, 7B, 7C and 7D, the display sections 701 and 702 are displayed in different colors for the sake of distinction. However, the display sections 701 and 702 do not necessarily need to be distinguished by color as long as the line 703 is displayed. If the line 703 alone is displayed without distinction by color, the total amount of ink stored in the two tanks during the moving operation can be appropriately displayed as described above.

The display changes from FIG. 7A to FIGS. 7B, 7C, and 7D in order, and returns to FIG. 7A in a cyclic manner. The display can also transition from FIG. 7C to 7A.

FIG. 7A illustrates a state when the replacement of the replaceable ink tank 402 is completed and ink is stored in the two ink tanks, i.e., the buffer tank 401 and the replaceable ink tank 402. The information indicating the tank state stored in the storage unit 132 is "full". If the ink in the buffer tank 401 is consumed by a print operation and the float sensor level of the buffer tank 401 falls to a predetermined level or below, the moving operation from the replaceable ink tank 402 is started. FIG. 7B illustrates the remaining ink amount display when the moving operation is started. When the moving operation from the replaceable ink tank 402 to the buffer tank 401 is started, the information indicating the tank state stored in the storage unit 132 is changed to "moving". In the present exemplary embodiment, a position of the line (total display line) 703 displayed on the UI remains unchanged between when the moving operation is started and when the moving operation is completed. Alternatively, the ink consumed by the print operation can be expressed by calculating the amount of ink consumed by the print operation and by periodically changing the total display line 703 based on predictions even during the moving operation.

When the moving operation is completed, the information indicating the tank state stored in the storage unit 132 is changed to "empty". As illustrated in FIG. 7C, only the remaining ink amount of the buffer tank 401 is displayed as the remaining ink amount while the information indicating the tank state of the replaceable ink tank 402 is "empty". Then, the ink in the buffer tank 401 is consumed by the print operation, and the display on the UI transitions to that of FIG. 7D. The display of either FIG. 7C or 7D is performed while there is no ink in the replaceable ink tank 402. Then, if the replaceable ink tank 402 is replaced by the user, the display returns to that of FIG. 7A.

As described above, according to the configuration of the present exemplary embodiment, the total remaining ink amount of the entire recording apparatus 1A including the buffer tank 401 and the replaceable ink tank 402 can be displayed. During the moving operation, the remaining ink amount display can be fixed to the level at the start of the moving operation for appropriate display, instead of the ink level detected by the float sensors 410.

In the exemplary embodiment described above, the recording apparatus main body includes one or a plurality of barcode readers included in the operation unit 133. There is no distinction as to which barcode reader is used for reading. Thus, the two-dimensional barcode 420 of the replaceable ink tank 402 and the two-dimensional barcode 421 of the mounting unit on which the replaceable ink tank 402 is mounted can be read by the same barcode reader or by different barcode readers. The two-dimensional barcodes are not restrictive as long as names and identifiers can be identified. The corresponding identification method is not limited to the barcode reader, either. The reading device may be one in which a display unit and an operation unit are integrated. For example, if the two-dimensional barcodes 420 and 421 are read by using a camera of a tablet terminal, a reading result can be displayed on a UI displayed on the tablet terminal. Operations needed to replace the replaceable ink tank 402 can then be performed on the UI.

Similar two-dimensional barcodes are attached not only to the replaceable ink tanks 402 but also to other replaceable parts. Information about the read two-dimensional barcodes is stored in a part information storage area provided in a RAM included in the storage unit 132. The part information storage area stores an identifier, a name, a lot number, and a unique serial number for each replaceable part. For the replaceable part other than the replaceable ink tank 402, such information is stored into the storage unit 132 once the accompanying two-dimensional barcode is read. For the replaceable ink tank 402, such information is stored into the storage unit 132 when the identifiers in two consecutively read two-dimensional barcodes are a combination of identifiers of a "replaceable ink tank" and a "mounting unit on which a replaceable ink tank is mounted" and the names (ink types) coincide with each other.

In the present exemplary embodiment, the information indicating that the replaceable ink tank 402 is detached and the replaceable ink tank 402 filled with ink is mounted is acquired based on the user's pressing of the replacement completion button 600. However, such a configuration is not restrictive. The main controller 13A may determine that a replaceable ink tank 402 is replaced by reading identifiers such as the two-dimensional barcodes 420 and 421 provided on both the replaceable ink tank 402 and the mounting unit as described above. The two-dimensional barcodes 420 and 421 may respectively include noncontact integrated circuit (IC) chips. If the noncontact IC chips are detected to approach each other within a predetermined distance, the main controller 13A may determine that the new replacement ink tank 402 is mounted and replacement is completed. Similarly, if the noncontact IC chips are detected to be separated from each other by a predetermined distance or more, the main controller 13A may determine that the user is replacing the replaceable ink tank 402.

The present exemplary embodiment has been described so that the replaceable ink tank 402 is determined to be replaced based on the fact that the replaceable ink tank 402 from which ink has been moved is detached from the mounting unit and a new replaceable ink tank 402 filled with ink is mounted on the mounting unit. However, the present exemplary embodiment is not limited to the replacement of the entire replaceable ink tank 402. For example, the user may replenish the replaceable ink tank 402 with ink while keeping the replaceable ink tank 402 mounted on the mounting unit. In such a case, when the replenishment of the replaceable ink tank 402 with a predetermined amount of ink is completed, the main controller 13A receives information indicating the completion from the user. Then, the main controller 13A can change the information indicating the tank state, assuming that the replaceable ink tank 402 replenished with the ink contains a predetermined amount of ink. Further, a measurement unit for measuring weight of the replaceable ink tank 402 may be provided. If the measured weight is greater than or equal to the weight when a predetermined amount of ink is stored, the main controller 13A may determine that the replaceable ink tank 402 is replaced or replenished with ink.

One or more functions of the foregoing exemplary embodiment can also be implemented by processing for supplying a program to a system or an apparatus via a network or a recording medium, and reading and executing the program by one or more processors of a computer of the system or the apparatus. A circuit for implementing one or more functions (for example, an application specific integrated circuit (ASIC)) can be used for implementation.

In the foregoing exemplary embodiment, a recording apparatus that use aqueous pigment ink containing water as a recording material has been described. However, the exemplary embodiment is not limited to the recording apparatus and is applicable to any apparatus that includes a reservoir unit for storing a liquid and a display unit for displaying the amount of the liquid.

Other Embodiments

Embodiment(s) can also be realized by a computer of a system or apparatus that reads out and executes computer executable instructions one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-148581, filed Aug. 7, 2018, which is hereby incorporated by reference herein in its entirety.

What is claimed is:

1. A recording apparatus comprising:
a recording unit;
a first reservoir configured to store a recording material to be supplied to the recording unit;
a sensor configured to detect a first amount of the recording material stored in the first reservoir;
a mounting member configured to detachably mount a second reservoir configured to store the recording material to be supplied to the first reservoir;
a moving member configured to perform a moving operation for moving the recording material stored in the second reservoir unit to the first reservoir;
an acquisition unit configured to acquire a mounting state of the second reservoir with respect to the mounting member; and
a display controller configured to display a display amount on a display unit based on the acquired mounting state,
wherein, in the case where the mounting state indicates the second reservoir is mounted on the mounting member before the moving operation is performed, the display amount is acquired by adding the detected first amount and a predetermined amount corresponding to an amount of the recording material stored in the second reservoir, and
wherein, in a case where the mounting state indicates the second reservoir is not mounted on the mounting member or the mounting state indicates the second reservoir is mounted on the mounting member after the moving operation is performed, the display amount is the detected first amount.

2. The recording apparatus according to claim 1, further comprising a controller configured to control driving of the moving member,
wherein the controller is configured to control the moving member to start the moving operation in a case where the amount detected by the sensor is less than a predetermined threshold.

3. The recording apparatus according to claim 1, wherein the moving member is configured to move all the recording material stored in the second reservoir to the first reservoir via the moving operation within a predetermined time period.

4. The recording apparatus according to claim 1, wherein the display amount is acquired without sensing an amount of the recording material stored in the second reservoir.

5. The recording apparatus according to claim 1, wherein the acquisition unit is configured to acquire the mounting state by accepting an input from a user.

6. The recording apparatus according to claim 1, wherein the acquisition unit is configured to acquire the mounting state by acquiring information about an identifier provided in the second reservoir.

7. The recording apparatus according to claim 1, wherein the display controller is configured to keep the display amount displayed on the display unit constant while the moving operation is performed.

8. The recording apparatus according to claim 1, wherein the display controller is configured to display information prompting replacement of the second reservoir on the display unit after the moving operation is performed.

9. The recording apparatus according to claim 1, wherein the display controller is configured to display information indicating that the moving operation is not being properly performed in a case where, in the moving operation, an increase as much as the predetermined amount is not detected by the sensor after a lapse of a predetermined time.

10. A control method for a recording apparatus including a recording unit, a first reservoir configured to store a recording material to be supplied to the recording unit, a sensor configured to detect a first amount of the recording material stored in the first reservoir, a mounting member configured to detachably mount a second reservoir configured to store the recording material to be supplied to the first reservoir, and a moving member configured to perform a moving operation for moving the recording material stored in the second reservoir to the first reservoir, the control method comprising:

acquiring a mounting state of the second reservoir with respect to the mounting member; and displaying a display amount based on the acquired mounting state, wherein in a case where the mounting state indicates the second reservoir is mounted on the mounting member before the moving operation is performed, the display amount is acquired by adding the detected first amount and a predetermined amount corresponding to an amount of the recording material stored in the second reservoir, and wherein, in a case where the mounting state indicates the second reservoir is not mounted on the mounting member or the mounting state indicates the second reservoir is not mounted on the mounting member after the moving operation is performed, the display amount is the detected first amount.

11. A control method for an apparatus wherein the apparatus includes a first reservoir configured to store a liquid, a sensor configured to detect a first amount of the liquid stored in the first reservoir, a mounting member configured to detachably mount a second reservoir configured to store the liquid to be supplied to the first reservoir, and a display unit configured to display information indicating a display amount of the liquid, the control method comprising:

acquiring at least either first information indicating that a state in which the second reservoir is not mounted on the mounting member has changed to a state in which the second reservoir is mounted on the mounting member or second information indicating that the second reservoir is replenished with the liquid and a predetermined amount of liquid is stored in the second reservoir; and displaying the information based on the acquiring, wherein, in a case where at least one of the first information and the second information is acquired in the acquiring, the display amount corresponding to the displayed information is acquired by adding the detected first amount and a predetermined amount corresponding to an amount of the liquid stored in the second reservoir, and wherein, in a case where neither the first information nor the second information is acquired in the acquiring, the display amount corresponding to the displayed information is the detected first amount.

12. The method according to claim 11, further comprising:

starting a moving operation to move a moving member in a case where the detected first amount by the sensor is less than a predetermined threshold.

13. The method according to claim 11, further comprising:

moving, via a moving operation, all of the recording material stored in the second reservoir to the first reservoir within a predetermined time period.

14. The method according to claim 11, further comprising:

maintaining the information displayed at a constant amount while a moving operation is performed.

15. The method according to claim 11, further comprising:

displaying information prompting replacement of the second reservoir after a moving operation is performed.

16. The method according to claim 11, further comprising:

displaying information indicating that a moving operation is not being properly performed in a case where, in the moving operation, an increase as much as the predetermined amount is not detected after a lapse of a predetermined time.

17. A recording apparatus comprising:

a recording unit;

a first reservoir configured to store a recording material to be supplied to the recording unit;

a sensor configured to detect a first amount of the recording material stored in the first reservoir;

a mounting member configured to detachably mount a second reservoir configured to store the recording material to be supplied to the first reservoir;

a moving member configured to perform a moving operation for moving the recording material stored in the second reservoir to the first reservoir;

an acquisition unit configured to acquire information indicating that a state in which the second reservoir is not mounted on the mounting member has changed to a state in which the second reservoir is mounted on the mounting member; and a display controller configured to display a display amount on a display unit based on a fact that the information is acquired by the acquisition unit, wherein the display amount is acquired by adding the first detected amount by the sensor and a predetermined amount corresponding to an amount of the recording material stored in the second reservoir, and wherein the display controller keeps the display amount constant while the moving operation is performed.

18. A non-transitory computer readable storage medium storing instructions that, when executed by one or more processors, causes a recording apparatus including a recording unit, a first reservoir configured to store a recording material to be supplied to the recording unit, a sensor configured to detect a first amount of the recording material stored in the first reservoir, a mounting member configured to detachably mount a second reservoir configured to store the recording material to be supplied to the first reservoir, and a moving member configured to perform a moving operation for moving the recording material stored in the second reservoir to the first reservoir, to perform a control method, the control method comprising:

acquiring a mounting state of the second reservoir with respect to the mounting member; and displaying a display amount based on the acquired mounting state, wherein, in a case where the mounting state indicates the second reservoir is mounted on the mounting member before the moving operation is performed, the display amount is acquired by adding the detected first amount and a predetermined amount corresponding to an amount of the recording material stored in the second reservoir, and wherein, in a case where the mounting state indicates the second reservoir is not mounted on the mounting member or the mounting state indicates the second reservoir is mounted on the mounting member after the moving operation is performed, the display amount is the detected first amount.

\* \* \* \* \*